United States Patent

(12) United States Patent
Ma

(10) Patent No.: US 9,179,429 B2
(45) Date of Patent: Nov. 3, 2015

(54) SYNCHRONIZATION METHOD, DEVICE, AND SYSTEM

(71) Applicant: Huawei Technologies Co., Ltd., Shenzhen (CN)

(72) Inventor: Shutao Ma, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 186 days.

(21) Appl. No.: 13/847,326

(22) Filed: Mar. 19, 2013

(65) Prior Publication Data

US 2013/0229982 A1  Sep. 5, 2013

Related U.S. Application Data

(63) Continuation of application No. PCT/CN2011/084389, filed on Dec. 21, 2011.

(51) Int. Cl.
*H04W 56/00* (2009.01)
*H04J 3/00* (2006.01)
*H04J 3/06* (2006.01)

(52) U.S. Cl.
CPC .............. *H04W 56/002* (2013.01); *H04J 3/00* (2013.01); *H04J 3/0667* (2013.01); *H04W 56/00* (2013.01); *H04W 56/0015* (2013.01)

(58) Field of Classification Search
CPC . H04L 7/0016; H04W 56/0015; H04W 56/00
USPC .......................................... 370/324, 328, 350
See application file for complete search history.

(56) References Cited

U.S. PATENT DOCUMENTS

2004/0213367 A1* 10/2004 Han .............................. 375/354
2010/0074278 A1* 3/2010 Dobjelevski et al. ......... 370/503
2010/0220748 A1* 9/2010 Inomata ........................ 370/503

FOREIGN PATENT DOCUMENTS

| CN | 101765199 A | * | 6/2010 |
| CN | 101932092 A | | 12/2010 |
| CN | 102104475 A | | 6/2011 |
| EP | 1484869 A2 | | 12/2004 |
| EP | 2159942 A2 | | 3/2010 |
| EP | 2341650 A1 | | 7/2011 |
| WO | WO 2010/025743 A1 | | 3/2010 |

OTHER PUBLICATIONS

Ruggedcom: "IEEE 1588 Precision Time Synchronization Solution for Electric Utilities" Mar. 2010, http://wwvv.ruggedcom.com/pdfs/white_papers/precision_timesync.pdf, pp. 1-8.
International Search Report issued in corresponding PCT Patent Application No. PCT/CN2011/084389, mailed Aug. 9, 2012.
Garner, IEEE 1588 Version 2, ISPCS, Ann Arbor, Sep. 24, 2008.

* cited by examiner

*Primary Examiner* — Andrew Lai
*Assistant Examiner* — Sumitra Ganguly
(74) *Attorney, Agent, or Firm* — Brinks Gilson & Lione

(57) ABSTRACT

Embodiments of the present disclosure provide a synchronization method, device, and system, and relate to the field of communications, so that a device deployment cost may be reduced and the stability of device synchronization may be improved. The method includes: acquiring, by a switching node, synchronization time from a main control node; and sending, by the switching node, the synchronization time to each controlled node that is connected to the switching node, so as to perform time synchronization between each controlled node and the main control node.

13 Claims, 3 Drawing Sheets

SYNCHRONIZATION METHOD, DEVICE, AND SYSTEM

CROSS-REFERENCE TO RELATED APPLICATIONS

This application is a continuation of International Application No. PCT/CN2011/084389, filed on Dec. 21, 2011, which is hereby incorporated by reference in its entirety.

TECHNICAL FIELD

The present disclosure relates to the field of communications, and in particular, to a synchronization method, device, and system.

BACKGROUND

In global system for mobile communications (GSM), universal mobile telecommunications system (UMTS), and long term evolution (LTE), frequency synchronization and time synchronization need to be performed between base stations for service timing and positioning functions. Optional frequency synchronization manners include the synchronous Ethernet, an E1 line clock (European 30-channel pulse code modulation is briefly referred to as E1), 1588V2 (precision clock synchronization protocol standard for network measurement and control systems), Global Positioning System (GPS), and so on; and optional time synchronization manners include 1588V2, GPS, and so on.

In the prior art, each base station needs to be installed with a GPS apparatus, so as to acquire time information and frequency information by using the GPS apparatus. Moreover, because synchronization time between base stations cannot be output through a backhaul path, a device deployment cost is relatively high.

SUMMARY

Embodiments of the present disclosure provide a synchronization method, device, and system, so as to solve a problem of high device deployment cost.

In one aspect, the present disclosure provides a synchronization method, including: acquiring, by a switching node, synchronization time from a main control node; and sending, by the switching node, the synchronization time to each controlled node that is connected to the switching node, and synchronizing time between each controlled node and the main control node.

In another aspect, the present disclosure provides a device, including: a controlled receiving unit, configured to acquire synchronization time from a main control node; and a main control sending unit, connected to controlled nodes in a one-to-one corresponding manner, and configured to send the synchronization time received by the controlled receiving unit to each controlled node that is connected to the device, so as to perform time synchronization between each controlled node and the main control node.

In another aspect, the present disclosure provides a system, including: a main control node device, configured to acquire synchronization time and send the synchronization time to a switching node device; the switching node device, configured to acquire the synchronization time from the main control node device, and send the synchronization time to each controlled node device that is connected to the switching node device; and a controlled node device, connected to the switching node device, and configured to receive the synchronization time sent by the switching node device, so as to implement time synchronization between each controlled node device and the main control node device.

In the foregoing solutions, it does not need to deploy a GPS on each node, thereby reducing a deployment cost. Furthermore, a direct connection manner may be used between a switching node and each controlled node, so that the number of intermediate transmission network elements is reduced, thereby improving the stability of node synchronization.

BRIEF DESCRIPTION OF DRAWINGS

To describe the solutions in the embodiments of the present disclosure more clearly, the accompanying drawings required for describing the embodiments or the prior art are briefly introduced in the following. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The solutions in the embodiments of the present disclosure are clearly and described in the following with reference to the accompanying drawings in the embodiments of the present disclosure. Apparently, the embodiments to be described are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
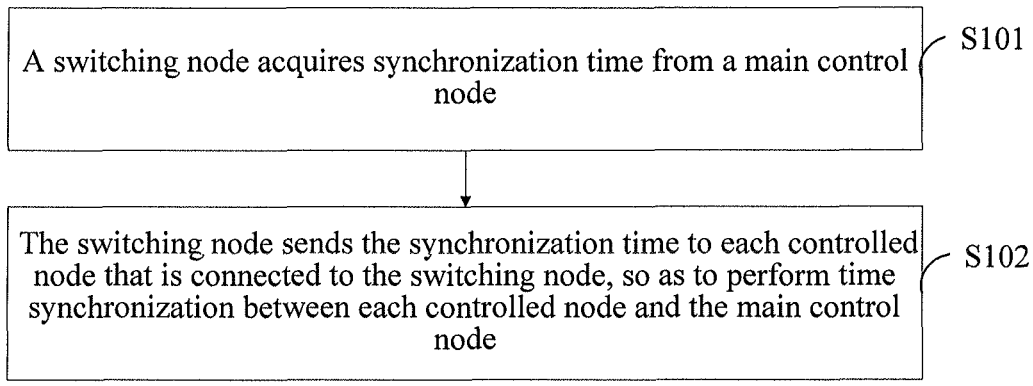
FIG. 1 is a schematic block diagram showing a procedure of a synchronization method according to an embodiment of the present disclosure.

A synchronization method provided in an embodiment of the present disclosure, as shown in FIG. 1, includes the following steps.

S101: A switching node acquires synchronization time from a main control node.

Optionally, before this step, the main control node performs, through a phase locked loop (PLL), time synchronization with a GPS that is connected to the main control node, so as to obtain the synchronization time.

S102: The switching node sends the synchronization time to each controlled node that is connected to the switching node, so as to perform time synchronization between each controlled node and the main control node.

With the node synchronization method provided in this embodiment of the present disclosure, it does not need to deploy a GPS on each node, thereby reducing a deployment cost. Furthermore, a direct connection manner may be used between a switching node and each controlled node, so that the number of intermediate transmission network elements is reduced, thereby improving the stability of node synchronization.

Figure 2:
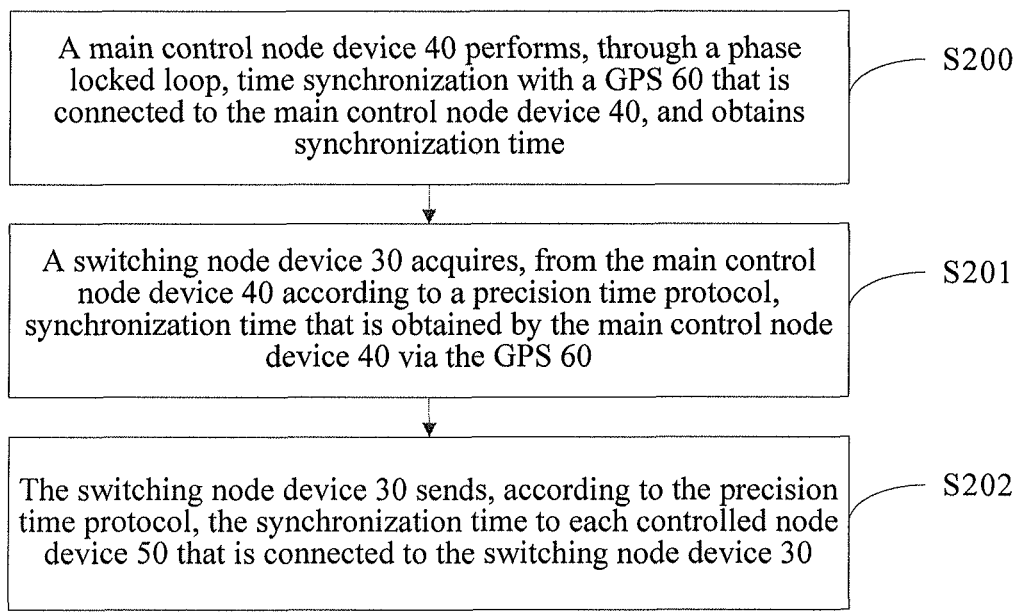
FIG. 2 is a schematic block diagram showing a procedure of a synchronization method according to another embodiment of the present disclosure.

A node synchronization method provided in another embodiment of the present disclosure is described with reference to FIG. 4. As shown in FIG. 2, the method includes the following steps.

S200: A main control node device 40 performs, through a PLL, time synchronization with a GPS 60 that is connected to the main control node device 40, and obtains synchronization time.

Definitely, the main control node device 40 may acquire the synchronization time in other manners, that is, an acquiring manner includes, but is not limited to, a manner of acquiring the synchronization time from the GPS, which is merely an example herein.

S201: A switching node device 30 acquires, from the main control node device 40 according to a precision time protocol (PTP), synchronization time that is obtained by the main control node device 40 via the GPS 60.

Herein, a precision time protocol supported by the switching node device 30 may be Institute of Electrical and Electronics Engineers (IEEE) 1588V2, and the protocol includes, but is not limited to, IEEE 1588V2. Performing time synchronization according to the PTP protocol refers to establishing a synchronization system between an information receiving party and an information sending party, and establishing a master-slave (master and slave, or called "main control and controlled") synchronization system in a whole synchronization system according to an optimal master clock algorithm; and by exchanging a PTP protocol packet, getting local synchronization time based on calculation.

S202: The switching node device 30 sends, according to the precision time protocol, the synchronization time to each controlled node device 50 that is connected to the switching node device 30.

Figure 4:
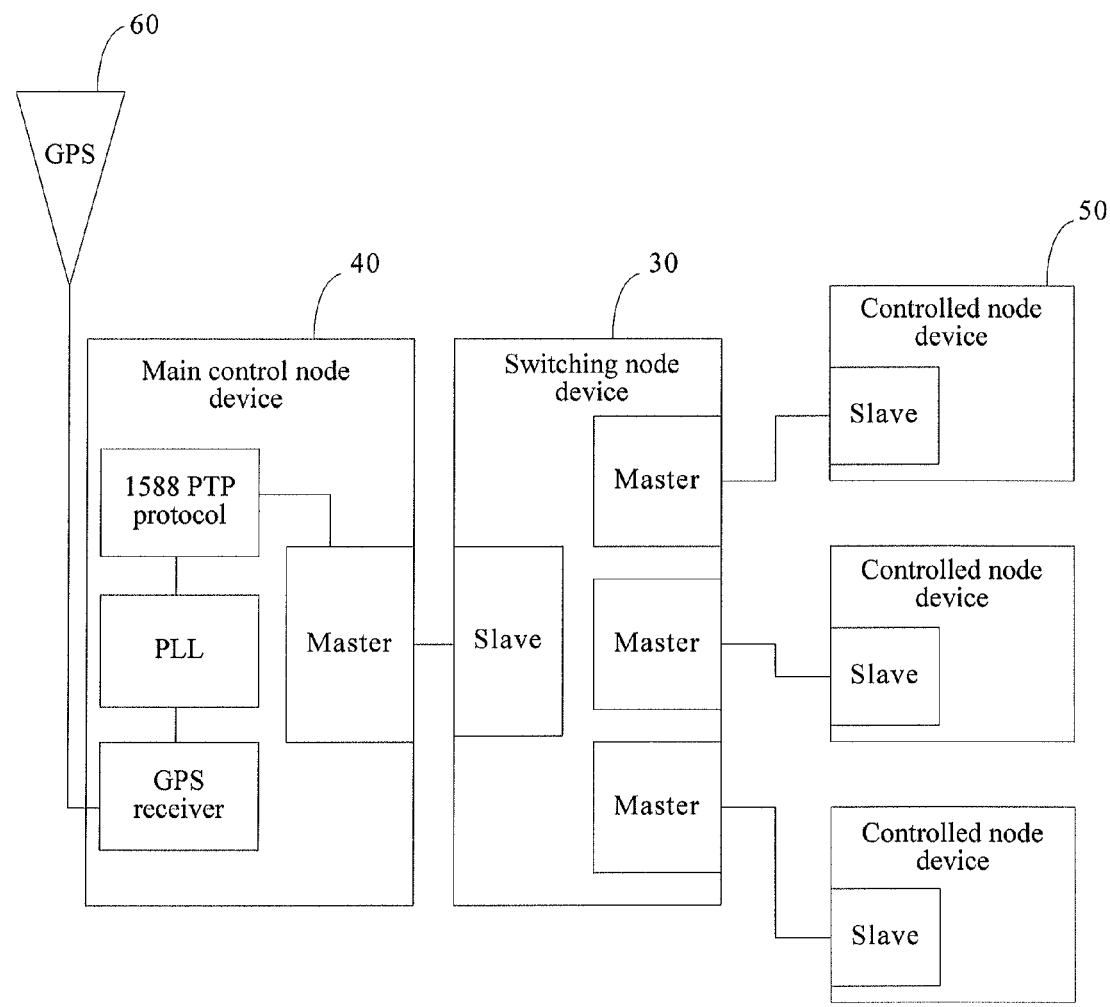
FIG. 4 is a schematic structural diagram of a system according to an embodiment of the present disclosure.

Referring to FIG. 4, the switching node device 30 may work in a BC mode (the BC mode generally corresponds to a multi-port device, where one port is used as a slave port, and other ports are used as master ports). A port that is connected to the main control node device 40 is in a slave mode, and at this time, a port that is connected to the switching node device 30 and is on the main control node device 40 is in a master mode; meanwhile, a port that connects the controlled node device 50 and is on the switching node device 30 is in a master mode, and at this time, a port that is connected to the switching node device 30 and is on the controlled node device 50 is in a slave mode.

Moreover, in this step, the used precision time protocol may be the same as that in step S201.

In this embodiment, the main control node device 40 and the controlled node device 50 may be base stations in an actual application, and the switching node device 30 may be a switch in an actual application.

With the synchronization method provided in this embodiment of the present disclosure, it does not need to deploy a GPS on each node, thereby reducing a deployment cost. Furthermore, a direct connection manner may be used between a switching node and each controlled node, so that the number of intermediate transmission network elements is reduced, thereby improving the stability of node synchronization.

The device 30 provided in this embodiment of the present disclosure may be applied in the foregoing method embodiment to execute all steps in the method embodiment; and for specific steps, reference may be made to the foregoing embodiment.

Figure 3:
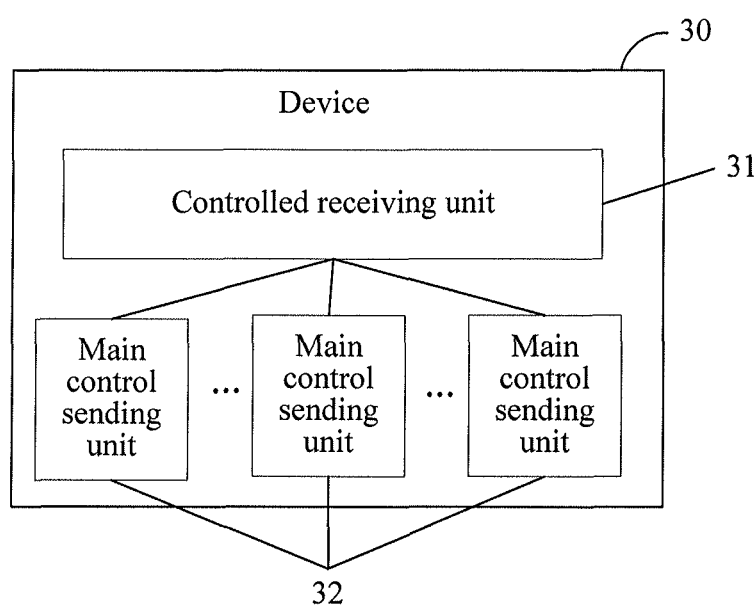
FIG. 3 is a schematic structural diagram of a device according to an embodiment of the present disclosure.

As shown in FIG. 3, the switching node device 30 includes a controlled receiving unit 31 and main control sending units 32.

The controlled receiving unit 31 is configured to acquire synchronization time from a main control node.

The main control sending units 32 are connected to controlled nodes in a one-to-one corresponding manner, and are configured to send the synchronization time received by the controlled receiving unit to each controlled node device that is connected to the switching node device, so as to perform time synchronization between each controlled node device and the main control node device.

Optionally, the device 30 is the switching node device, the foregoing switching node device includes a switch; the main control node device includes a base station, such as a main control base station; and the controlled node device includes a base station, such as a controlled base station.

With the device provided in this embodiment of the present disclosure, it does not need to deploy a GPS on each node device, thereby reducing a deployment cost. Furthermore, a direct connection manner may be used between a switching node device and each controlled node device, so that the number of intermediate transmission network elements is reduced, thereby improving the stability of node synchronization.

The device provided in the foregoing embodiment may be used for establishing a system, and an example is given for description in the following. A system provided in another embodiment of the present disclosure, as shown in FIG. 4, includes:

a main control node device 40, configured to acquire synchronization time and send the synchronization time to a switching node device 30;

the switching node device 30, configured to acquire the synchronization time from the main control node device 40; and send the synchronization time to each controlled node device 50 that is connected to the switching node device 30; and the controlled node devices 50, each connected to the switching node device 30, and configured to receive the synchronization time sent by the switching node device 30, so as to perform time synchronization between each controlled node device 50 and the main control node device 40.

Optionally, the system further includes:

a GPS device 60 that is connected to the main control node device, where the main control node device 30 acquires the synchronization time via the GPS device 60.

Optionally, the foregoing switching node device includes a switch; the main control node device includes a base station, such as a main control base station; and the controlled node device includes a base station, such as a controlled base station.

With the system provided in this embodiment of the present disclosure, it does not need to deploy a GPS on each node device, thereby reducing a deployment cost. Furthermore, a direct connection manner may be used between a switching node device and each controlled node device, so that the number of intermediate transmission network elements is reduced, thereby improving the stability of node device synchronization.

Persons of ordinary skill in the art may understand that all or part of the steps of the foregoing method embodiments may be implemented by a program instructing relevant hardware. The foregoing program may be stored in a computer readable storage medium. When the program is run, the steps of the foregoing method embodiments are performed. The foregoing storage medium may be any medium capable of storing program codes, such as a Read-Only Memory (ROM), a Random Access Memory (RAM), a magnetic disk, or an optical disk.

The foregoing descriptions are merely specific embodiments of the present disclosure, but are not intended to limit the protection scope of the present disclosure. Any variation or replacement readily figured out by persons skilled in the art within the scope disclosed in the present disclosure shall all fall within the protection scope of the present disclosure. Therefore, the protection scope of the present disclosure shall be subject to the protection scope of the claims.

What is claimed is:

1. A synchronization method, comprising:
   acquiring by a main control node through a phase locked loop, time synchronization with a Global Positioning System (GPS), wherein the main control node comprises a main base station;
   acquiring, by a switching node at an input port, the synchronization time from the main control node, wherein the switching node comprises a switch with a plurality of output ports, each of the plurality of output ports is directly connected to the input port to directly forward the synchronization time acquired from the main control node to each respective controlled node that is separately and independently connected to the switching node, wherein each of the respective controlled node comprises a controlled base station which directly utilizes only the acquired synchronization time at the input port of the switching node to perform concurrent time synchronization between each respective controlled node and the main control node.

2. The method according to claim 1, wherein the acquiring, by the switching node, the synchronization time from the main control node comprises:
   acquiring, by the switching node, the synchronization time from the main control node according to a precision time protocol.

3. The method according to claim 2, wherein sending, by the switching node, only the synchronization time to each respective controlled node that is connected to the switching node comprises:
   forwarding by the switching node according to the precision time protocol, only the synchronization time to each respective controlled node that is separately and independently connected to a corresponding output port of the switching node.

4. A device, comprising:
   a switch which comprises: an input port and a plurality of output ports which are directly connected to the input port to directly forward time signals acquired at the input port;
      a controlled receiving circuitry, configured to acquire at the input port of the switch, a synchronization time from a main control node, wherein the main control node comprises a main base station which acquires the synchronization time from a Global Positioning System (GPS) through a phase locked loop; and
      a main control sending circuitry, connected through respective output ports of the switch, to respective controlled nodes in a one-to-one corresponding manner, and configured to directly forward the acquired synchronization time acquired at the input port of the switch by the controlled receiving circuitry to each respective controlled node that is separately and independently connected to a corresponding output port of the switch on the device, wherein each of the respective controlled nodes comprises a controlled base station which directly utilizes only the acquired synchronization time at the input port of the switch to perform concurrent time synchronization between the main control node and the respective controlled node.

5. The device according to claim 4, wherein the controlled receiving unit is further configured to acquire the synchronization time from the main control node according to a precision time protocol.

6. The device according to claim 4, wherein the controlled receiving circuitry is further configured to acquire the synchronization time based on connection between the input port in a slave mode on the device and a port in a master mode on the main control node.

7. The device according to claim 4, wherein the main control sending circuitry is further configured to directly forward only the synchronization time received by the controlled receiving circuitry at the input port to each respective controlled node that is separately and independently connected to the device according to a precision time protocol.

8. The device according to claim 4, wherein the main control sending circuitry is further configured to send the only synchronization time received by the controlled receiving circuitry based on connection between a respective output port in a master mode on the device and a port in a slave mode on each respective controlled node that is connected to the device.

9. A system, comprising:
   a main control node, configured to:
      acquire through a phase locked loop, synchronization time via a Global Positioning System (GPS), wherein the main control node comprises a main base station, and
      send the synchronization time to a switching node;
   the switching node, configured to:
      acquire at an input port the synchronization time from the main control node, wherein the switching node comprises a switch with a plurality of output ports, each of the plurality of output ports is directly connected to the input port to directly forward the acquired synchronization time to each respective controlled node that is separately and independently connected to a corresponding output port of the switching node; and
   the respective controlled node, connected to the corresponding output port of the switching node, and configured to:
      receive the synchronization time forwarded directly by the switching node, wherein the respective controlled node comprises a controlled base station which directly utilizes only the acquired synchronization time at the input port of the switching node so as to perform concurrent time synchronization between each respective controlled node and the main control node.

10. The system according to claim 9, wherein transmission between the main control node and the switching node is according to a precision time protocol.

11. The system according to claim 9, wherein transmission between the switching node and the respective controlled node is according to a precision time protocol.

12. The system according to claim 9, wherein the input port of the switching node that is connected to the main control node device is in a slave mode, and a port on the main control node device that is connected to the input port of the switching node device is in a master mode.

13. The system according to claim 9, wherein the corresponding output port on the switching node device that is connected to the respective controlled node device is in a master mode, and a port on the respective controlled node device that is connected to the corresponding input port of the switching node device is in a slave mode.

* * * * *